(12) United States Patent
Ukai et al.

(10) Patent No.: US 7,293,294 B2
(45) Date of Patent: Nov. 6, 2007

(54) METHOD AND APPARATUS FOR USING CONTENTS

(75) Inventors: Hiromi Ukai, Machida (JP); Shigeki Hirasawa, Machida (JP); Kousuke Anzai, Yokohama (JP); Isao Echizen, Yokohama (JP); Hiroshi Yoshiura, Tokyo (JP); Masataka Okayama, Fujisawa (JP); Shuichi Tago, Abiko (JP)

(73) Assignee: Hitachi, Ltd., Tokyo (JP)

( * ) Notice: Subject to any disclaimer, the term of this patent is extended or adjusted under 35 U.S.C. 154(b) by 841 days.

(21) Appl. No.: 10/620,206

(22) Filed: Jul. 15, 2003

(65) Prior Publication Data

US 2004/0088549 A1 May 6, 2004

(30) Foreign Application Priority Data

Nov. 6, 2002 (JP) ............................. 2002-321962

(51) Int. Cl.
*H04L 29/00* (2006.01)
*H04L 9/00* (2006.01)
(52) U.S. Cl. ........................................ 726/32; 705/59
(58) Field of Classification Search ................ 713/157; 380/279; 726/28, 29, 30, 32
See application file for complete search history.

(56) References Cited

U.S. PATENT DOCUMENTS 6,950,941 B1 * 9/2005 Lee et al. .................. 713/193

2001/0051996 A1 * 12/2001 Cooper et al. .............. 709/217
2002/0034305 A1 * 3/2002 Noyama et al. ............ 380/282

FOREIGN PATENT DOCUMENTS

| JP | 2000-330873 | 11/2000 |
|---|---|---|
| JP | 2001-236403 | 8/2001 |
| JP | 2001-256192 | 9/2001 |

* cited by examiner

*Primary Examiner*—Matthew B Smithers
(74) *Attorney, Agent, or Firm*—Hogan & Hartson LLP

(57) ABSTRACT

A method for using digital contents is provided. In the method, a request is made to a provider apparatus for a certificate containing a first provider ID embedded therein by a certification authority, and the certificate is received from the provider apparatus. A decision is made by using the certificate as to whether or not the provider is authorized by the certification authority. A request is made to the provider apparatus for a digital content having a second provider ID embedded therein by a contents guarantee authority when the provider is authorized by the certification authority, and the digital content is received from the provider. The first provider ID is read from the certificate, the digital content is correlated with the second provider ID, and the digital content is stored in a storage medium. The second provider ID is detected from the digital content in response to a request to use the digital content. The first provider ID is compared with the second provider ID when the second provider ID is detected. The digital content is used when the first provider ID and the second provider ID match. The use of the digital content is restricted when the first provider ID and the second provider ID do no match.

20 Claims, 12 Drawing Sheets

Fig. 8

| Watermark of Provider ID<br><br>○: Present<br>×: Absent | Provider authorized<br><br><br>○: Yes<br>×: No | Matching between Watermark Provider ID and Provider ID obtained by Verification<br>○: Matched<br>×: Not matched<br>—: Impossible to compare | Distribution route of content by Provider<br><br>○: Legal<br>×: Illegal<br>—: Outside of Mg. | Usability of Content<br><br><br>○: Yes<br>×: No |
|---|---|---|---|---|
| ○ | ○ | ○ | ○ | ○ |
|   |   | × | × | ×<br>Notify CGA |
| ○ | × | — | × | ×<br>Notify CGA |
| × | ○ | — | — | ○ |
| × | × | — | — | ○ |

Outside of Mg.= Outside of Management

Notify CGA= Notify Contents Guarantee Authority

Fig. 9

| Watermark of Content ID  ◯: Present  ✕: Absent | Distribution route of content by Provider (800 (Fig. 8))  ◯: Legal  ✕: Illegal  —: Outside of Mg. | Distribution route of content  ◯: Legal  ✕: Illegal  —: Outside of Mg. | Usability of Content  ◯: Yes  ✕: No |
|---|---|---|---|
| ◯ | ◯ | ◯ | ◯ |
| ✕ | ◯ | ◯ | ◯ |
| ◯ | ✕ | ✕ | ✕ Notify CGA |
| ✕ | ✕ | ✕ | ✕ Notify CGA |
| ◯ | — | ✕ | ✕ Notify CGA |
| ✕ | — | — | ◯ |

Outside of Mg.= Outside of Management

Notify CGA= Notify Contents Guarantee Authority

Fig. 10

| Watermark of User ID  ○ : Present  × : Absent | Matching between Watermark User ID and Serial Number of Terminal  ○ : Matched  × : Not matched | Distribution route of content by Terminal  ○ : Legal  × : Illegal  — : Outside of Mg. | Usability of Content  ○ : Yes  × : No |
|---|---|---|---|
| ○ | ○ | ○ | ○ |
| ○ | × | × | × |
| × | — | — | ○ |

Outside of Mg.= Outside of Management

Fig. 11

| Distribution route of content by Provider (800 (Fig. 8))<br><br>○: Legal<br>×: Illegal<br>—: Outside of Mg. | Distribution route of content by Terminal (900 (Fig. 9))<br><br>○: Legal<br>×: Illegal<br>—: Outside of Mg | Distribution route of content<br><br><br>○: Legal<br>×: Illegal<br>—: Outside of Mg. | Usability of Content<br><br><br>○: Yes<br>×: No |
|---|---|---|---|
| ○ | ○ | ○ | ○ |
| ○ | × | × | ×<br>Notify CGA |
| ○ | — | Provider: ○<br>User Terminal: — | ○ |
| × | ○ | × | ×<br>Notify CGA |
| × | × | × | × |
| × | — | × | ×<br>Notify CGA |
| — | ○ | Provider: —<br>User Terminal: ○ | ○<br>Notify CGA |
| — | × | Provider: —<br>User Terminal: × | × |
| — | — | — | ○ |

Outside of Mg.= Outside of Management

Notify CGA= Notify Contents Guarantee Authority

Fig. 12

| Watermark of Content ID<br><br>○ :Present<br>× :Absent | Distribution route of content by Provider (900 (Fig. 9))<br><br>○ : Legal<br>× : Illegal<br>— : Outside of | Distribution route of content by Terminal (1000 (Fig. 10))<br><br>○ :Legal<br>× :Illegal<br>— :Outside of Mg | Distribution route of content<br><br>○ : Legal<br>× : Illegal<br>— : Outside of Mg. | Usability of Content<br><br>○ : Yes<br>× : No |
|---|---|---|---|---|
| ○ | ○ | ○ | ○ | ○ |
| ○ | ○ | × | × | × Notify CGA |
| ○ | ○ | — | Provider : ○<br>User Terminal : — | ○ |
| × | ○ | ○ | ○ | ○ |
| × | ○ | × | × | × Notify CGA |
| × | ○ | — | Provider : ○<br>User Terminal : — | ○ |
| ○ | × | ○ | × | × Notify CGA |
| ○ | × | × | × | × Notify CGA |
| ○ | × | — | × | × Notify CGA |
| × | × | ○ | × | × Notify CGA |
| × | × | × | × | × Notify CGA |
| × | × | — | × | × Notify CGA |
| ○ | — | ○ | × | × Notify CGA |
| ○ | — | × | × | × Notify CGA |
| ○ | — | — | × | × Notify CGA |
| × | — | ○ | Provider : —<br>User Terminal : ○ | ○ |
| × | — | × | × | × |
| × | — | — | — | ○ |

Outside of Mg.= Outside of Management

Notify CGA= Notify C ntents Guarantee Authority

METHOD AND APPARATUS FOR USING CONTENTS

BACKGROUND OF THE INVENTION

1. Field of the Invention

The present invention relates to systems and methods for managing circulation passages of digital contents.

2. Related Background Art

With the recent progress of streaming technology and data compression technology, the broadband communications have begun to spread rapidly into households, and digital contents of large volumes such as moving pictures and music pieces have begun to be distributed through communications networks. While digital contents have advantages in that they can be readily copied and processed and their quality do not deteriorate, there is a substantial problem in that their copyright may be infringed by the illegal use.

To prevent the problem of illegal use, there is provided a technique in which digital contents are digitally encrypted by a digital key, and the key is distributed to the user/user terminal as a license independently of the digital contents to protect the copyright. When the digital contents are used, the system checks the presence or absence of the license and/or refers to use condition information contained in the license. Only when the use conditions such as the term of validity are met, the digital contents can be used. According to this system, even when the digital contents are illegally copied, anyone who does not have the license cannot use the digital contents. Furthermore, there is a technique in which a characteristic number of each user terminal is embedded in each digital key upon generating the key, in other words, a different digital key is created for each of different user terminals, and distributed, such that even when the digital contents together with the license are copied onto a different terminal, the key cannot be used at the different terminal where the copy has been made, thereby preventing the illegal use of the digital contents.

Also, in accordance with other techniques proposed, copyright information is embedded in digital contents using digital watermarks to detect the illegal use.

For example, in one of the techniques proposed, ID information is embedded as watermark information in contents that may be used in web pages; ID information and use conditions are registered in a use permission data base (DB); and a monitor center compares the ID information embedded in the contents with the ID information and use conditions registered in the use permission data DB to detect the illegal use of the contents.

Also, in another of the techniques proposed, information that specifies contents to be purchased, a contents distributor and an ID number assigned to each of the purchasers are embedded as watermark information in contents data that are to be distributed.

However, the conventional techniques that use licenses as described above are open to possibilities where the license information may be altered, decrypted contents may be illegally distributed, and the like. Also, when the digital contents leak out, there are no means available to specify from where the contents leak out, which makes it difficult to stop the leakage of the contents.

The conventional techniques that use electronic watermarks to monitor the illegal use are capable of monitoring illegal publications of digital contents on the web pages, but cannot monitor the illegal use that takes place where the monitor center cannot access, such as copying the contents among users' terminals. Moreover, although an enormous amount of contents are currently used on the web pages, it is difficult to monitor all of them.

SUMMARY OF THE INVENTION

The present invention relates to systems and methods for securing distribution routes of digital contents for either or both of holders of contents and users of contents.

The present invention also relates to system and methods for preventing illegal distribution of digital contents.

The present invention also relates to system and methods by which the copyright of contents holders.

In accordance with an embodiment of the present invention, a certification authority is provided for authenticating contents and providers of the contents, and the certification authority issues electronic certificates only to providers that are authenticated by the certification authority to distribute contents. Identifiers (i.e., provider IDs) for uniquely identifying the respective providers are described in the electronic certificates. The provider IDs are managed and issued by the certification authority. Each contents holder requests a provider who is authenticated by the certification authority, in other words, a provider who owns an electronic certificate issued by the certification authority, to distribute its contents. By implementing a license system on the providers, contents distribution routes can be specified.

Intermediation of contents from contents holders to contents providers are conducted by a contents guarantee authority that is authorized by the certification authority. The contents guarantee authority receives contents from a contents holder, embeds a provider ID of a provider using electronic watermark, and delivers the contents to a contents provider that corresponds to the embedded provider ID. The provider ID that has been once written is made impossible to be altered. By so doing, the provider cannot alter the distribution route.

The provider distributes the contents to user terminals. The contents to be distributed are those that have been received from the contents holder through the contents guarantee authority and have the provider ID identifying itself embedded as electronic watermark information. Also, the provider owns the electronic certificate that has been issued by the certification authority, and the provider ID indicating the provider itself is described in the electronic certificate.

A user terminal refers to the electronic certificate owned by the provider to thereby confirm that the provider has been authorized by the certification authority, and then receives the contents. The received contents are stored in a contents archive section. At this moment, a contents name that uniquely identifies the contents within the terminal and the provider ID that identifies the provider are stored in a tamper resistant region. The tamper resistant region is a region that has a physical and logical structure that resists against external illegal accesses. The user terminal is equipped with a watermark detection function. When the contents are used, the watermark detection function detects the electronic watermark of the provider ID in the contents that has been embedded by the contents guarantee authority, and confirms if a provider ID of the provider that is stored in a region that is not rewritable by users matches with the provider ID of the electronic watermark. If they match, it is determined that the distribution route of the contents is legal, and the contents are permitted to be used. If they do not match, it is determined that the distribution route of the contents is illegal, the use of the contents is stopped, and the illegality is notified to the contents guarantee authority. As a result, the contents that are distributed through an illegal route and the provider who illegally distributes such contents can be detected. Also, the illegal use can be detected at the user terminal without installing a network police.

Other objects, features and advantages of the invention will become apparent from the following detailed description taken in conjunction with the accompanying drawings.

BRIEF DESCRIPTION OF THE DRAWINGS

FIG. 8 is an example of a table that summarizes a contents distribution route management using provider IDs and usability of contents at a terminal.

FIG. 9 is an example of a table that summarizes a contents distribution route management using contents IDs and provider IDs, and usability of contents at a terminal.

FIG. 10 is an example of a table that summarizes a contents distribution route management using user IDs and usability of contents at a terminal.

FIG. 11 is an example of a table that summarizes a contents distribution route management using user IDs and provider IDs and usability of contents at a terminal.

FIG. 12 is an example of a table that summarizes a contents distribution route management using contents IDs and provider IDs and usability of contents at a terminal.

DESCRIPTION OF THE PREFERRED EMBODIMENTS

Figure 1:
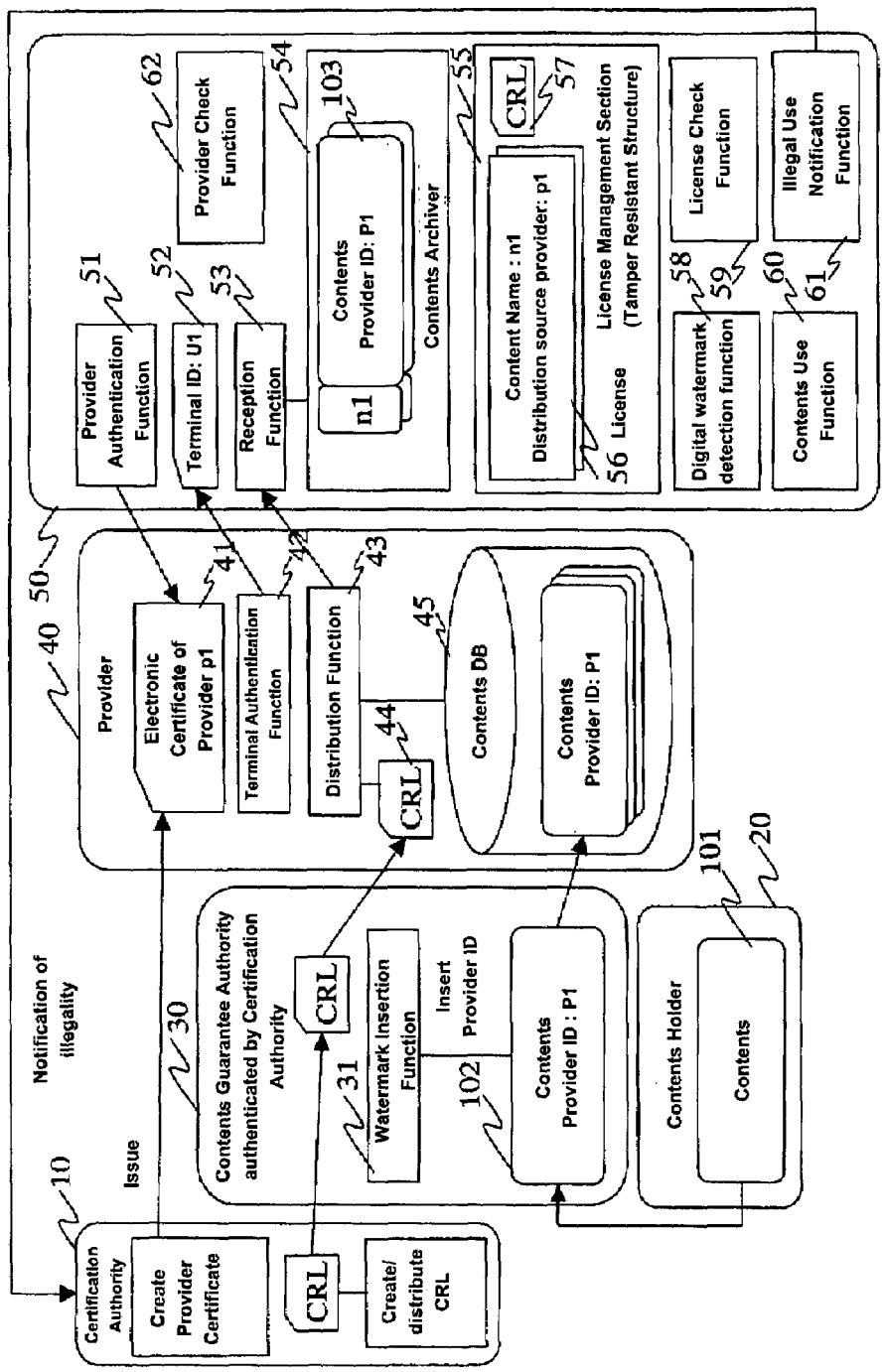
FIG. 1 is a diagram showing a general configuration of a digital contents distribution system in accordance with an embodiment of the present invention.

FIG. 1 is a diagram showing a general configuration of a contents protection system in accordance with an embodiment of the present invention. The contents protection system of the present embodiment is equipped at least with a certification authority 10 that authenticates digital contents (hereafter, simply referred to as "contents") and a provider 40, a contents holder 20 that owns contents (and/or copyright of the contents), a contents guarantee authority 30 that intermediates contents, a provider 40 that provides (distributes) contents to a user's terminal 50 with which the user uses contents. The contents guarantee authority 30 and the provider 40 need to be authorized by the certification authority 10. The certification authority 10 and the provider 40, the certification authority 10 and the contents guarantee authority 30, the contents holder 20 and the contents guarantee authority 30, the contents guarantee authority 30 and the provider 40, and the provider 40 and the terminal 50 may preferably be connected through a network, respectively. However, the certification authority 10 and the provider 40, and the certification authority 10 and the contents guarantee authority 30 may not be connected through a network, respectively. Each of the certification authority 10, the contents holder 20, the contents guarantee authority 30, the provider 40 and the terminal 50 may preferably be equipped with a processor device (e.g., a central processing unit (CPU)), a storage device and a communication device. Further, the terminal 50 may preferably be equipped with an input device and an output device (including a display device, speakers, and the like). The provider 40 may preferably be a server apparatus. The processor device executes processings according to each relevant program to thereby realize functions of each of the devices. It is noted that contents may include licenses for decoding encoded contents. In this case, the terminal 50 can merely receive licenses from the provider 40, such that the terminal 50 does not have to receive encoded contents from the provider 40, but may receive encoded contents from other providers.

The following is a description of a case where a watermark of a provider ID is inserted in contents. In this case, it is assumed that a content 101 owned by the contents holder 20 is distributed from the provider 40 to the terminal 50 and used at the terminal 50.

First, the content 101 is sent from the contents holder 20 to the contents guarantee authority 30. The contents guarantee authority 30 uses a watermark insertion function 31 to embed a provider ID of the provider in the content 101. The provider ID is an identifier for uniquely identifying each provider. In this example, the provider ID of the provider 40 is assumed to be P1. In order to prevent alteration of watermarks, a mechanism is implemented in each watermark that makes it impossible to rewrite the watermark once it is written. The content 101 turns into a content 102 with the provider ID being embedded. The contents guarantee authority 30 sends the content 102 to the provider 40, and the provider 40 registers the content 102 in a contents database (contents DB) 45. By embedding the provider ID that is not rewritable in the content before the content is delivered to the provider 40, illegal acts by the provider 40 to alter the provider ID and distribute the content can be prevented. The contents guarantee authority 30 may not intermediate the content, but may only embed the watermark in the content, and the contents holder 20 may directly deliver the content to the provider. Any well known technique may be used to embed the watermark in the content.

The provider 40 owns a provider certificate 41. The provider certificate 41 is a certificate that is issued by the certification authority 10, and the provider who owns the certificate 41 is a provider who can distribute the content in the system of the present embodiment. However, the certificate becomes revoked when the provider distributes illegal contents. Revoked certificates are listed in a certificate revocation list (CRL) 44. The certification authority 10 creates the CRL 44, and sends the CRL 44 to the contents guarantee authority 30; and the contents guarantee authority 30 distributes the CRL 44 to the provider 40. Also, the certification authority 10 distributes the CRL 44 to the terminal 50. Alternatively, the expiration of validity period (for example, one week, one month, or the like) may be set on each certificate, and new certificates may be frequently issued, such that expired certificates are deemed to be invalid, whereby the validity of the provider certificate can be maintained without using the CRL.

When the terminal 50 receives a content receiving request from the user, and requests, in response to the user's request, the provider 40 to distribute the content 102, the terminal 50 initially uses a provider check function 62 to check the authenticity of the provider.

Figure 2:
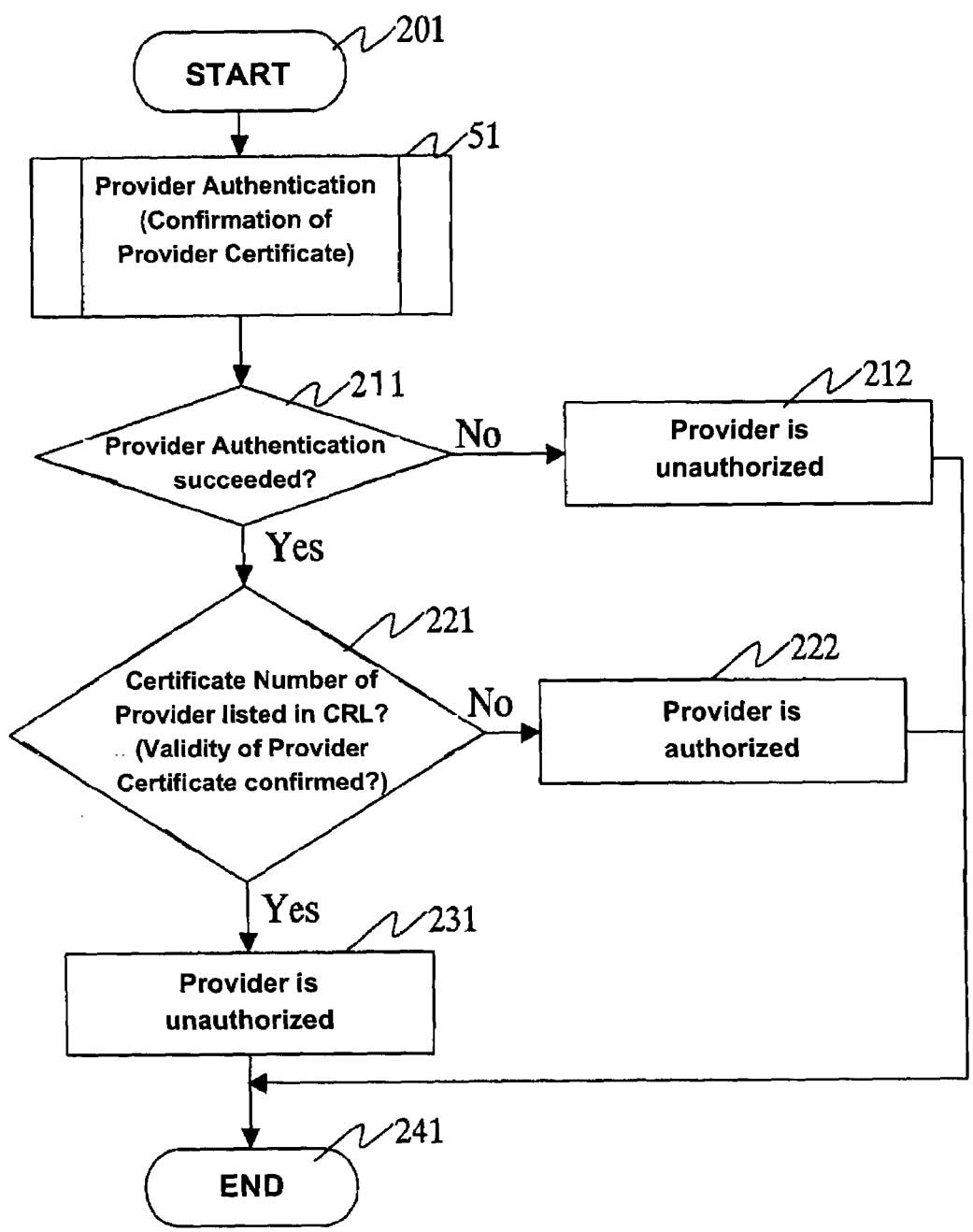
FIG. 2 is a flow chart of a provider checking processing.

FIG. 2 is a flow chart of processing performed by the provider check function 62. A provider authentication function 51 authenticates the provider by referring to the provider certificate 41. Prior to sending a request to distribute the content, the terminal 50 requests the provider 40 for the provider certificate 41 (step 51). In step 211, the terminal 50 determines that the provider 40 owns the provider certificate 41 and the provider authentication succeeds, when it receives the provider certificate 41 from the provider 40 in response to the request for the provider certificate 41: on the other hand, the terminal 50 determines that the provider 40 does not own the provider certificate 41 and the provider authentication fails, when it does not receive the provider certificate 41 from the provider 40 in response to the request for the provider certificate 41. When the provider authentication fails, the terminal 50 judges that the provider is an unauthorized provider (step 212), and stops the provider authentication process (step 241). When the provider authentication succeeds, the terminal 50 confirms if the certification number of the provider certificate 41 is not described in the CRL 44 (step 221). If the certification number is not written in the CRL 44, the terminal 50 determines that the provider is an authorized provider (step 222). If the certification number of the provider certificate 41 is written in the CRL 44, the terminal 50 determines that the provider is an unauthorized provider, and ends the process of checking the provider (step 241).

In the meantime, the provider 40 uses a terminal authentication function 42 to judge if the terminal 50 complies with the contents protection function of the present system, and distributes the content 102 to the terminal 50 using a distribution function 43 if the terminal 50 is determined to be in compliance with the contents protection function. On the other hand, if the terminal 50 is determined not to be in compliance with the contents protection function, the distribution of the content is terminated or stopped. Whether or not the terminal 50 complies with the contents protection function of the present system may be determined through checking a terminal ID 52 uniquely assigned to the terminal 50. In other words, the provider 40 stores terminal IDs that comply with the contents protection function of the present system, and compares the terminal ID 52 received from the terminal 50 with the terminal IDs pre-stored at the provider 40 before or upon distributing the content. The provider 40 judges that the terminal 50 is a proper terminal when the terminal ID 52 matches with one of the terminal IDs stored, and judges that the terminal 50 is not a proper terminal when the terminal ID 52 does not match with any one of the terminal IDs stored. By distributing contents only to those complying terminals, the distribution of contents to terminals that do not have the function to check contents distribution routes can be prevented. However, the terminal authentication function 42 may not be an indispensable function. When the terminal authentication function 42 is not provided, contents may be distributed to and used at terminals that do not comply with the contents protection function of the present system, and it is highly possible that the contents may be copied onto other terminals and used there. The damage that may be incurred by copying the contents among those terminals may be small if such copying is limited to a small amount. But if a bad provider distributes contents in a great amount, or large quantities of copies are made among the users, the damage may become widespread. Even in this situation, if terminals with the license checking function of the present system are prevailing in the market, illegal contents can be detected at the terminal, and illegally distributed contents can be readily discovered before the damage becomes widespread. Accordingly, the terminal authentication function 42 may not be an indispensable function, but the provision of the terminal authentication function 42 can raise the level of prevention capability to prevent illegal distribution of contents.

Figure 3:
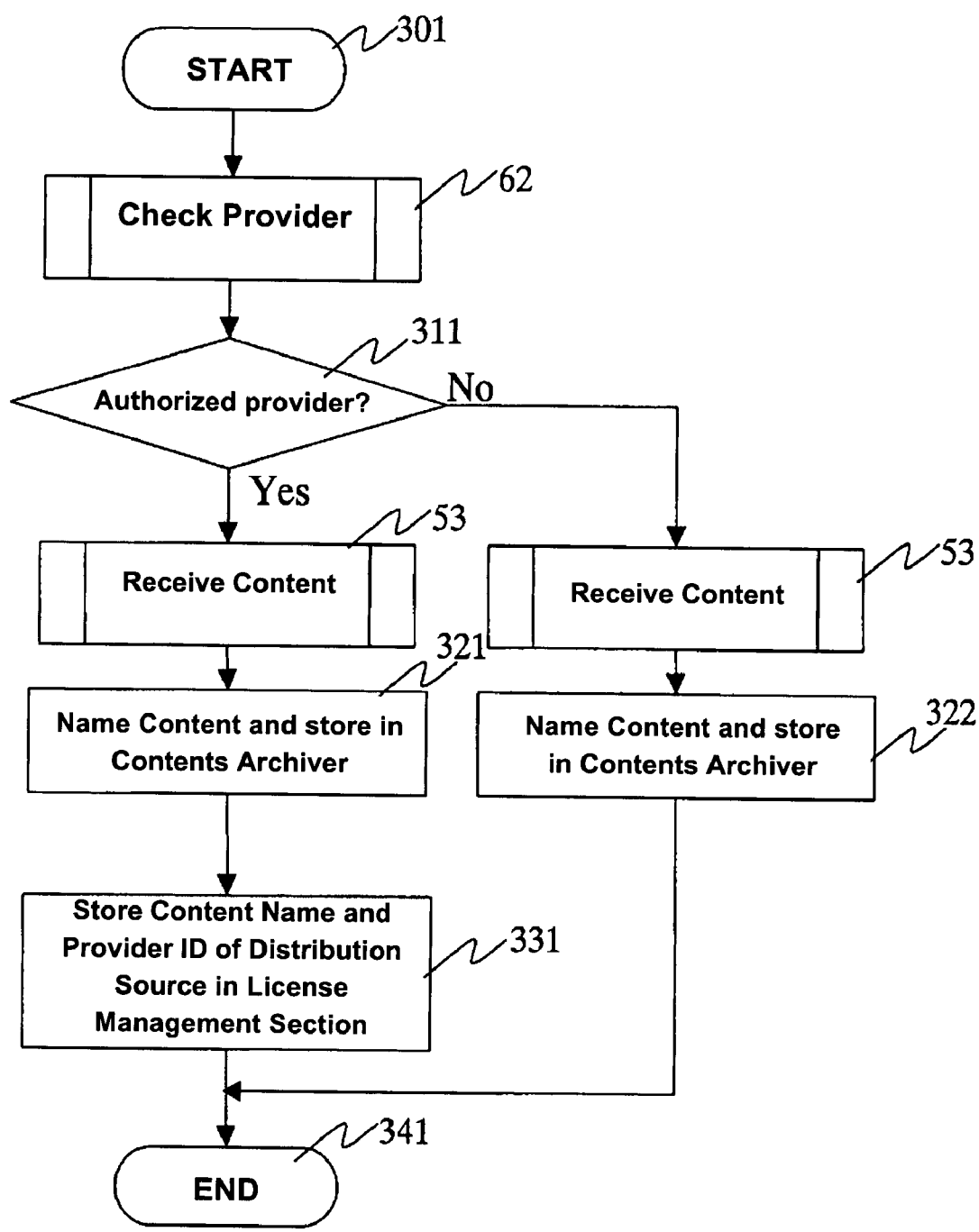
FIG. 3 is a flow chart of a contents reception processing.

FIG. 3 is a flow chart of operations that take place when the content is received at the terminal 50. After judging by the provider check function 62 as to whether the provider is authorized, the terminal 50 uses a reception function 53 to receive the content (step 53) when it is determined that the provider is an authorized provider (step 311). A content name is given to the received content and stored in a contents storage section (hereafter referred to as a "contents archiver") 54 (step 321). Also, the provider ID p1 is read from the provider certificate 41, paired with the content name, and stored in a license management section 55 (step 331). The license management section 55 is a region that has a higher and stronger tamper resistance property (i.e., a region that has a tamper resistance structure, such as, for example, an IC card chip or the like) compared to the contents archiver 54 (which is, for example, a hard disk or a flash memory). The provider ID is described in the provider certificate 41. It is assumed in this example that the provider certificate 41 of the provider 40 describes p1 as the provider ID, and a content name n1 given to the content. The provider ID p1 and the content name n1 are paired as a pair 56 and stored in the license management section 55. The contents archiver 54 and/or the license management section 55 may be freely attached to or detached from the terminal 50.

In the case of an unauthorized provider, the reception function 53 is used to receive the content (step 53). A content name is given to the content and stored in the content storage section 54 (step 322), and the processing to receive the content ends (step 341). The pair 56 of the content name and the provider ID of the distribution source is stored in the license management section 55 for the following reason. The provider ID that is embedded in the content is an identifier of a provider who is authorized to distribute the content, and an identifier of the actual provider that is the distribution source is a provider ID that is described in the provider certificate. Since the provider ID is managed and issued by the certification authority 10, the provider ID embedded in the content and the identifier of the actual provider should be the same if the content is distributed through a legal authorized distribution route.

Accordingly, by comparing the provider ID embedded in the content and the provided ID of the distribution source, the legality of the distribution route of the content can be judged. In order to make this judgment always, the pair 56 of the content name and the provider ID of the distribution source is stored in the license management section 55. This paired information 56 may be considered a license (i.e., license information) to guarantee the legality of the distribution route of the content, and thus the license can be automatically generated on the terminal side. The license management section 55 has a tamper resistant structure that prevents illegal accesses and alterations, and therefore users cannot alter the pair 56 of the content name and the provider ID of the distribution source. The tamper resistant structure means a structure that incorporates physical and logical technologies that counter against external illegal accesses, and has been put in practical use in areas of IC cards or the like. It is noted that, in general, when a downstream side device (client device) receives contents, the downstream side device sends a certificate of the downstream side device to an upstream side device (server device), and the upstream side device uses the certificate to certify the downstream side device. However, in accordance with the embodiment of the present invention, when a downstream side device receives contents, an upstream side device sends a certificate of the upstream side device to the downstream side device, and the downstream side device uses the certificate to certify the upstream side device.

In the description made so far, the contents holder 20, the contents guarantee authority 30 and the provider 40 are described as independent units. However, a single unit may be equipped with all of them or a part of them.

Next, a description is made as to a flow of processings when the content is used at the terminal. First, a license check function 59 of the terminal 50 judges the legality of the contents distribution route. Then, if the distribution route is not illegal, a contents use function 60 reproduces music and/or image from the content; and if the distribution route is illegal, an illegality notification function 61 notifies the certification authority 10 or other relevant authorities of the illegal distribution.

Figure 4:
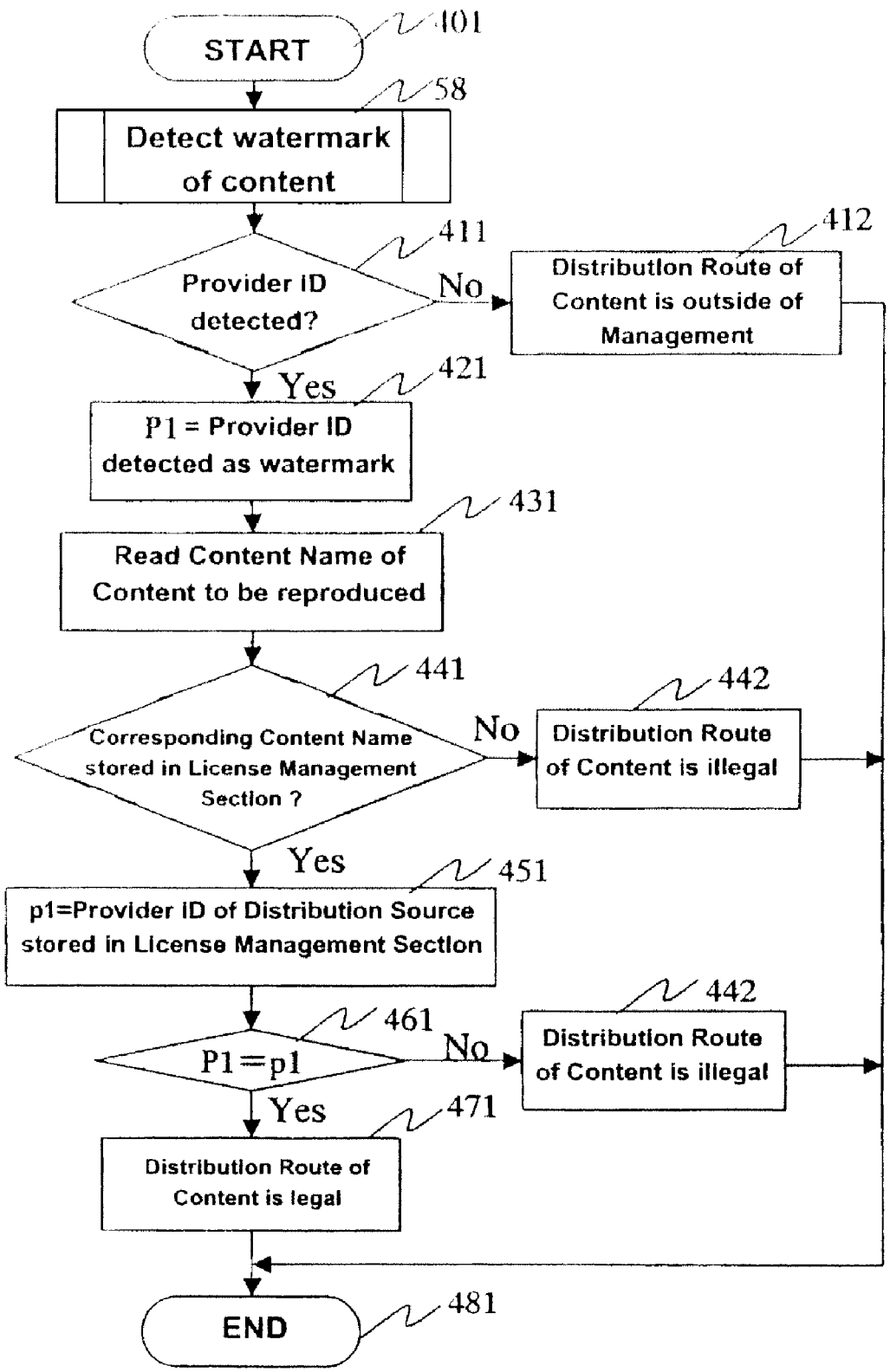
FIG. 4 is a flow chart of a license checking processing, which uses provider IDs.

FIG. 4 shows a flow chart of a license checking process 400 using provider IDs. License checking processes may be conducted by various methods using contents IDs or user IDs, other than the method using provider IDs, and therefore a function that performs any of the license checking processes is generally represented in FIG. 1 as the license checking function 59. The license checking function 400 using provider IDs first uses a watermark detection function 58 to detect a watermark indicating a provider ID embedded in the content, and then judges whether or not the provider ID is detected (step 411). When a provider ID is not detected, a determination "The distribution route of content is outside the management" is made, and the processing ends (step 481).

When a provider ID is detected, the provider ID detected in the watermark is set as a value P1, the content name of the content to be reproduced is read out from the contents archiver 54 (step 431), and a judgment is made whether or not the corresponding content name is stored in the license management section 55 (step 441). If the content name is not stored in the license management section 55, the license information 56 does not exist in the license management section 55. In this case, there are possibilities that the content may have been illegally copied among terminals, and/or an illegal provider may have distributed the content of the authorized provider, and accordingly, a determination "The distribution route of content is illegal" is made, and the processing ends (step 481).

When it is judged in step 441 that the content name is stored in the license management section 55, the provider ID of the distribution source of the license information 56 is set as a value p1, and the values P1 and p1 are compared (step 461). If the values P1 and p1 are the same, a determination "The distribution route of the content is legal" is made (step 471). If the values P1 and p1 are not the same, the distribution route of the content is not legal, a determination "The distribution route of the content is illegal" is made, and the processing ends (step 462). The watermark detection function 58 and the license check function 59 may function when the content is used, or when the content is received from the provider 40, or is stored in the contents archiver 54.

Another provider (not shown) that intermediates distribution of contents from the provider 40 to the terminal 50 may be present between the provider 40 and the terminal 50. In this case, the terminal 50 receives a provider certificate 41 from the provider 40, and receives contents from the other provider. In other words, the distribution route of the provider certificate 41 and the distribution route of the contents are different form each other.

Figure 7:
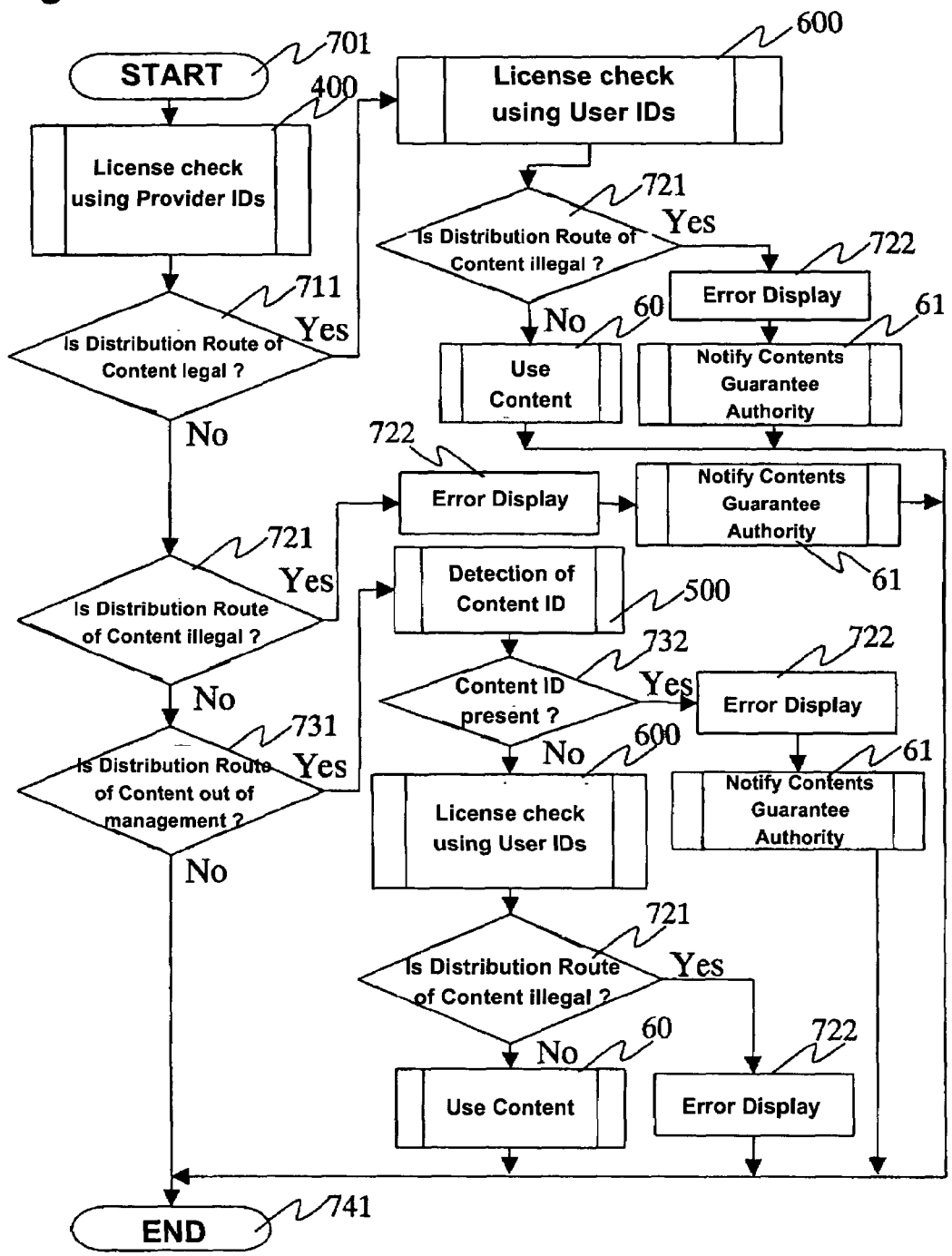
FIG. 7 is a flow chart of the use of contents, which uses user IDs, provider IDs and contents IDs.

Referring to FIG. 7, a description is made as to a flow of the use of contents when provider IDs are used. FIG. 7 shows a flow of the use of contents when user IDs, provider IDs and contents ID are used. However, in this example, only the provider IDs are used, and a license check processing 600 using user IDs, and processings relating to a detection processing 500 for detecting contents IDs are not executed. First, upon receiving a content use request from the user, a license check processing 400 using provider IDs is conducted in response to the request. If it is determined (in step 711) that "the distribution route of the content is legal" (Yes), processings in steps 600, 721, 722 and 61 are omitted, and the content is used through the contents use function 60. When it is determined (in step 721) that "the distribution route of the content is illegal" (Yes), an error display is made (step 722), the illegality notification function 61 notifies the certification authority 10 of the illegality, the use of the content is stopped and the processing ends (step 741). When it is determined (in step 731) that "the distribution route of the content is outside of the management" (Yes), processings in steps 500, 732, 722 and 61, and processings in steps 600, 721 and 722 are omitted, and the content is used through the contents use function 60, and the processing ends (step 741).

FIG. 8 is a table indicating a contents distribution route management using provider IDs and the usability of contents at a terminal. When the terminal detects an illegality, the use of the content may simply be stopped, the illegality notification function 61 may not be required, or the content may be deleted from the contents archiver 54. Also, the terminal 50 may notify the contents holder 20 and the contents guarantee authority 30 of the illegality.

By embedding in contents a provider ID as watermark of a provider that distributes the contents, and making the watermark once embedded impossible to rewrite, information that specifies the distributor of the contents can be distributed together with the contents. By providing functions of comparing an ID of a provider that actually distributes the contents and the watermark provider ID embedded when the contents are used, and stopping the use of the contents when the distribution route is illegal, the illegal use of the contents can be prevented. Furthermore, by providing a function of notifying the contents guarantee authority of illegality when illegal distribution is detected at a terminal, illegality can be detected at the terminal without providing a network police for controlling illegal activities. Also, contents that are distributed from illegal providers cannot be used at terminals even without providing an illegality notification function, it can be expected that the illegal providers would lose their credit, and a substantial preventive effect in preventing illegal activities can be expected.

In recent years, there are many cases where contents include their attributes called meta data added to header sections of the contents, and content IDs may accompany as meta data. In the example shown in FIG. 1, the license information 56 composed of a pair of the content name and the provider ID of the distribution source is stored in the license management section 55. However, when the content is accompanied with a content ID as meta data, a pair of the content ID and the provider ID of the distribution source may be stored in the license management section 55 as license information 602, instead of storing the pair of the content name and the provider ID of the distribution source in the license management section 55. When the content ID is used instead of the license information 56, the content ID is used instead of the content name in steps 431 and 441 shown in FIG. 4. Also, in accordance with another method, the license management section 55 and the contents archiver 54 may be provided in a portable medium such as a memory card, and the contents may be moved to the portable medium for use.

The content 103 and the license 56 do not need to exist in the form of files. For example, when the content is used while the content is being received through using a streaming technology, a part of the content exists in a main storage region of the terminal. Accordingly, the contents archiver 54 and the license management section 55 may be a main storage. When the system of the present embodiment is applied to the streaming technology, processings are conducted such that the content is used while simultaneously detecting the provider ID in watermark, and the use of the content is stopped at the moment when the use of the content is determined to be illegal.

Next, a description is made as to a case where a content ID and a provider ID are embedded in a content as watermark information.

There may be a method in which, in addition to the provider ID, a content ID may be added as watermark in the content. For example, the contents holder 20 may be provided with a watermark insertion function equivalent to the watermark insertion function 31 to insert the content ID in the content 101. Content IDs are managed by the certification authority 10, and each content ID may be provided with, for example, a set of higher-order digits that is uniquely assigned to each of the contents holders such that the content IDs can readily identify which contents belong to which contents holders. The certification authority 10 manages only IDs of the contents holders, and content IDs may be given within each of the contents holders. Each of the contents holders may request the contents guarantee authority 30 to insert watermark information of content IDs. However, because each content ID has an identifier incorporated therein that uniquely identifies each corresponding contents holder that owns contents, it is necessary that each content holder is able to confirm its content ID before any content is delivered to a provider in order to prevent illegal distribution of the content, and therefore it is dangerous if providers insert content IDs.

Figure 5:
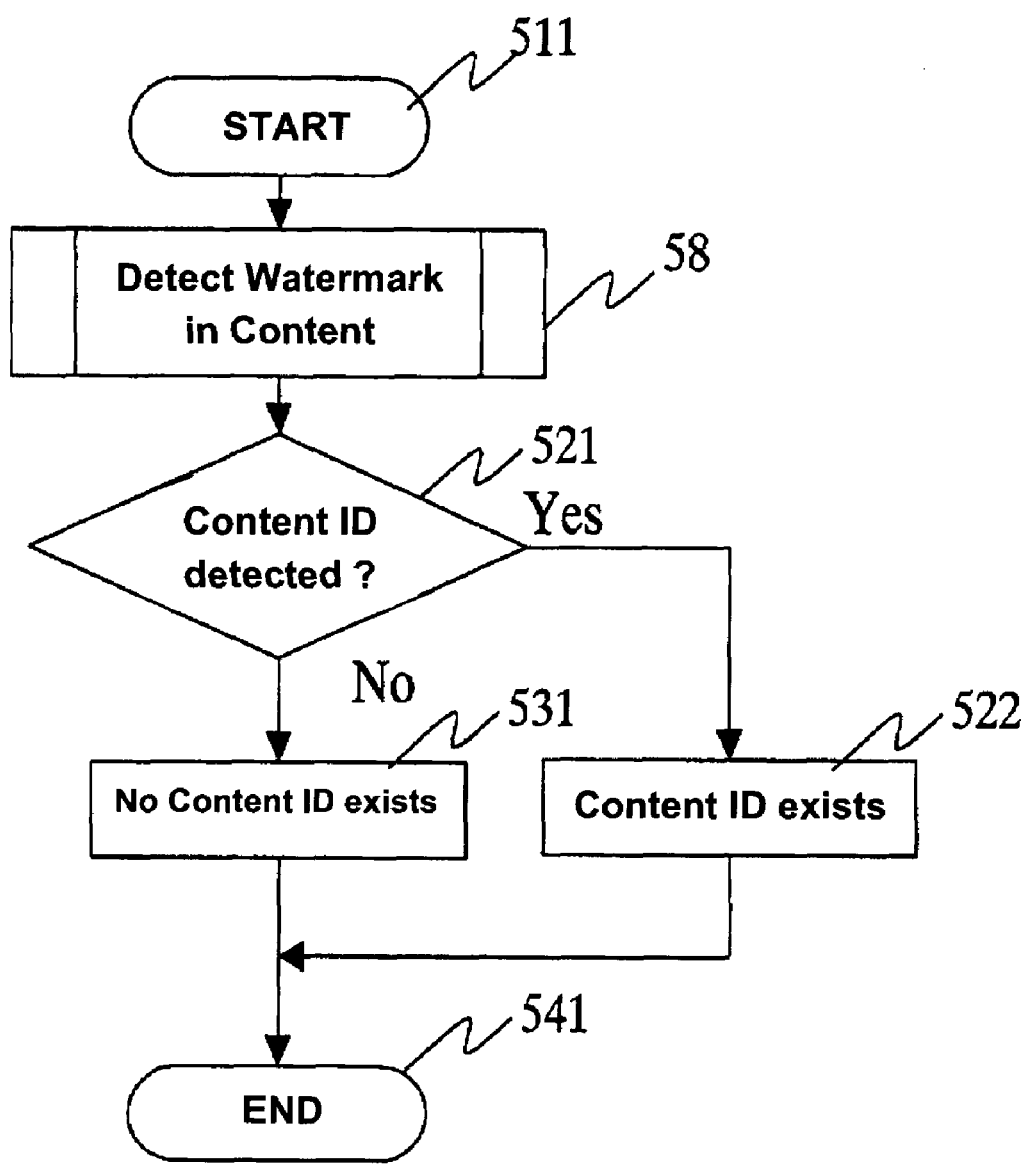
FIG. 5 is a flow chart of a processing to detect contents IDs.

FIG. 5 shows a flow chart of processings to detect content ID (i.e., a content ID detection processing 500). The watermark detection function 58 detects watermark information of the content (step 58). If the content ID as watermark information is detected (Yes in step 521), it is judged that "the content ID is present" (step 522), and if the content ID is not detected (No in step 521), it is judged that "the content ID is not present" (step 531), and the processing ends (step 541).

Referring to FIG. 7, a description is made as to a case where the content is used, using the content ID and provider ID. In this example, since the user ID is not used and processings relating to the user ID are not executed, their description is therefore omitted. After a license check processing 400 is performed using the provider IDs like in the case of the flow of the use of contents using provider IDs, one of different processings is conducted depending on the result of the license check processing 400. Following each of steps 711 and 721, processings that are the same as those in the case of the flow of the use of contents using provider IDs are conducted. When it is determined in step 731 that "the distribution route of the content is outside the management" (Yes), the detection processing 500 for detecting contents IDs is conducted. If it is judged in step 732 that a content ID is present (Yes), an error display is made (step 722), the illegality notification function 61 is used to notify the contents guarantee authority 30 of the illegal content, the use of the content is stopped, and the processing ends (step 741). The illegality notification function 61 may not be provided. If it is determined in step 732 that a content ID is not present (No), the content is used through the contents use function 60, and the processing ends (step 741).

FIG. 9 is a table indicating an example of a contents distribution route management using content IDs and provider IDs and the usability of contents at a terminal. When the terminal detects an illegality, the use of the content may simply be stopped, and the contents guarantee authority may not be notified. When the content contains a watermark content ID, and the distribution route of the provider's content is outside of the management, the content cannot be used in this example. However, the use of the content may be allowed depending on practical uses. When a watermark content ID is not detected in the content, and the distribution route of the provider's content is determined to be illegal, the content cannot be used in this example. However, the use of the content may be allowed if a watermark content ID is not detected in the content depending on practical uses. There may be a plurality of practical uses. When a more strict control is conducted on contents on the upstream side close to the contents holder, whether or not contents can be used (i.e., the usability of contents) is judged on condition that content IDs are embedded in the contents. Unless otherwise, detection of watermark content IDs may be utilized in a manner that the detection does not affect the usability of contents.

As described above, by inserting a content ID and a provider ID in each content(s), the correctness of the distribution route between the contents holder and the provider can be confirmed. By implementing in each content ID a scheme to identify each contents holder, and inserting the content ID in each content in a manner that the content ID cannot be rewritten, which content holder distributes which content can be readily found, and the origin of contents can be securely confirmed. If a watermark content ID were inserted in every content, it could be readily found that, when a content ID is inserted in a content and the provider's distribution route is outside of the management, the content is illegal, and the content has leaked after the content ID was inserted in the content by a contents holder. Also, watermarks may be inserted in a content at various stages of distribution route, such as, for example, a watermark that can identify the contents guarantee authority 30, such that a point of leak at which the content leaked can be detected.

Next, a description is made as to a case in which user IDs are inserted as watermark information in contents.

To designate devices that are authorized to use contents, a user ID that incorporates a number unique to each of the devices may be used as an ID, and the user ID may be embedded as watermark information in each content. Characteristic numbers (e.g., serial numbers) of terminals, product numbers of software which is required to use contents at terminals, card numbers of IC cards, product numbers of memory cards, and the like may be used as user IDs. Watermark user IDs may be embedded by at least two different methods. For example, in one method, the provider 40 may be equipped with a watermark insertion function that is equivalent to the watermark insertion function 31 described in FIG. 1, and the provider 40 embeds watermark user IDs in contents when the contents are distributed. In the other method, the terminal 50 may be equipped with a watermark insertion function that is equivalent to the watermark insertion function 31 described in FIG. 1, and the terminal 50 embeds watermark user IDs in contents after the terminal 50 receives the contents.

Figure 6:
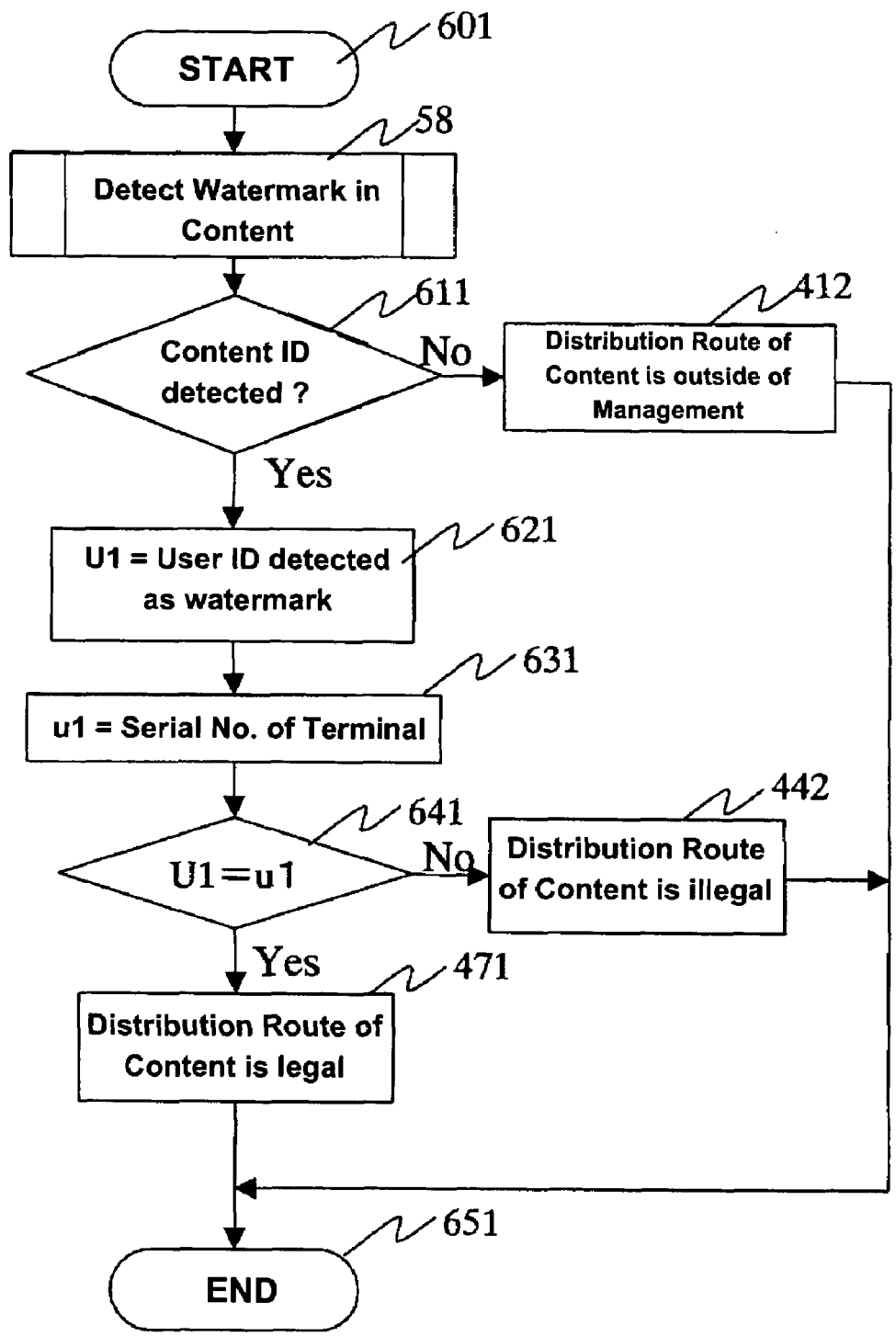
FIG. 6 is a flow chart of a license checking processing, which uses user IDs.

FIG. 6 shows a flow chart of a license check processing 600 using user IDs. When the processing 600 starts (step 601), the watermark detection function 58 detects watermark information embedded in a content received. If a user ID is detected (Yes in step 611), a value of the user ID detected is substituted in U1 (step 621), and a manufacturing serial number of the terminal is substituted in u1 (step 631). When values of U1 and u1 are the same (Yes in step 641), it is judged that "the distribution route of the content is legal" (step 471), and when they are not the same, it is judged that "the distribution route of the content is illegal" (step 442), and the processing ends (step 651). If a user ID is not detected in step 611 (No), it is determined that "the distribution route of the content is outside of the management" (step 412), and the processing ends (step 651). In this example, the manufacturing serial number of the terminal is used as a user ID. However, the user ID may not have to be the same as a manufacturing serial number of the terminal as long as the user ID can uniquely identify the terminal.

Referring to FIG. 7, a processing flow of the use of contents when user IDs are used is described. In this example, content IDs and provider IDs are not used, and therefore processings relating to content IDs and provider IDs are omitted. When the processing starts (701), a license check processing using user IDs is conducted in step 600. If it is determined in step 721 that the distribution route of the content is illegal (Yes), an error display is made (step 722), and the use of the content is stopped and the processing stops (step 741). When the judgment in step 721 fails, the content is used through the contents use function 60, and the processing ends (step 741).

FIG. 10 is a table indicating an example of a contents distribution route management using user IDs and the usability of contents at a terminal. In this example, a manufacturing serial number of a terminal is used as a user ID. When the watermark user ID is different from the serial number of the terminal, it is judged that the terminal is different from a terminal that has been authorized to use the content, and the terminal is trying to use the content; and therefore the use of the content is stopped. Whether or not the content can be used and whether or not a notification should be made to the contents guarantee authority do not need to be the same as those indicated in FIG. 7.

As described above, by using identifiers that designate authorized terminals as user IDs and inserting the user IDs as watermark information in contents, and providing a function to control the use of contents according to whether or not each terminal can detect and identify the user IDs, terminals that use contents can be specified. When any one of the user terminals illegally leaks contents, since such contents are embedded with a watermark user ID (watermark information) that identifies the user terminal, which one of the user terminals leaked the contents can be confirmed by detecting the watermark information.

Next, a description is made as to a case where provider IDs and user IDs are inserted in contents as watermark information.

According to one method, a provider ID in addition to a user ID may be embedded in a content as watermark information. This method may be realized by a combination of the methods described above, i.e., the method in which provider IDs are inserted in contents and the method in which user IDs are inserted in contents. Referring to FIG. 7, a description is made as to a processing flow of the use of contents using provider IDs and user IDs. In this example, content IDs are not used, and therefore descriptions of the detection of content ID and its related processings are omitted. The processing starts (step 701), and a license check processing 400 using provider IDs is conducted. If it is determined in step 711 that "the distribution route of the content is legal" (Yes), a license check processing 600 using user IDs is conducted. As a result, if it is determined that "the distribution route of the content is illegal" (Yes in step 721), an error display is made (step 722), the contents guarantee authority is notified of the illegality (step 61), the use of the content is stopped, and the processing ends (step 741). If the judgment in step 721 is negative, the content is used through the contents use function 60, and the processing ends (step 741). When it is judged in step 721 that "the distribution route of the content is illegal" (Yes), the processing in steps 722 and 61 are conducted like in the processing flow of the use of contents that uses provider IDs described above, and the processing ends (step 741). When it is judged in step 731 that "the distribution route of the content is outside of the management" (Yes), a series of processings in steps 500, 732, 722 and 61 relating to content IDs are omitted, and the processing proceeds to step 600. In step 600, a license check processing using user IDs is conducted. When it is determined in step 721 that "the distribution route of the content is illegal" (Yes), an error display (step 722) is conducted, and the use of the content is stopped; and if the judgment is negative (No), the content is used by the contents use function 60, and the processing ends (step 741).

FIG. 11 is a table indicating an example of a contents distribution route management using provider IDs and user IDs and the usability of contents at a terminal. There may be many different practical usages as to whether or not the content can be used and whether or not a notification should be made to the contents guarantee authority. For example, when the distribution route relating to providers is legal, but the distribution route relating to terminals is illegal, the content cannot be used as indicated in FIG. 11, and the contents guarantee authority is notified of the illegality. An example of such distribution routes may possibly happen when an individual who legally purchased the content becomes an illegal provider and illegally distributes the content in large quantities. Even when such an illegal act is committed, the notification function notifies the contents guarantee authority of such illegality, the number of legally distributed copies of the content is compared with the number of illegality notifications that the contents guarantee authority is notified, and a determination can be made that there is a high possibility that the content is illegally distributed, when the illegality notifications are clearly too many. In other practical usages, when the content cannot be used as indicated in FIG. 11, only an error may be displayed, a display that recommends to purchase the content from legal providers may be made, or a web site for purchasing the license may be additionally provided and the current user terminal may be connected to the web site.

In this manner, by inserting a provider ID and user ID as watermark information in contents, the contents can be distributed in a manner that the legal distribution route of the contents between the provider and the terminal is embedded in the contents, and the legality of the provider and the legality of the terminal can be confirmed by comparing the actual distribution route of the contents and the legal distribution route embedded in the contents.

Next, a description is made as to a case where content IDs, provider IDs and user IDs are inserted as watermark information in contents.

In one method, a content ID, provider ID and user ID may be inserted as watermark information in contents. Referring to FIG. 7, a description is made as to a flow of the use of the content when a content ID, provider ID and user ID are used. Processings from the start of the processing (step 701) to step 731 are the same as those of the flow of the use of contents when provider IDs and user Ids are used. When it is determined in step 731 that "the distribution route of the content is outside the management" (Yes), the detection processing 500 for detecting contents IDs is conducted. If it is judged in step 732 that a content ID is present (Yes), an error display is made (step 722), the contents guarantee authority 30 is notified of the illegality (step 61), and the processing ends (step 741). If a content ID is not detected, the processings in step 600, 721, 722 and 60 are conducted like in the case of the use of provider IDs and user IDs, and the processing ends (step 741). The flow of the use of contents may change depending on whether or not content IDs are inserted in all contents.

When contents are free of charge, or personally created for free distribution (free-of-charge contents), content IDs may not be inserted. Therefore, this processing example assumes that content IDs may not be inserted in some of contents, and allows the use of contents even when content IDs are not inserted in the contents. Also, this processing example assumes that any content having a content ID inserted therein is distributed through an authorized provider. Therefore, when a content ID is inserted in contents, but the distribution route relating to providers is outside of the management, the processing assumes that an illegal distribution took place, and the use of the contents is stopped.

FIG. 12 is a table indicating an example of a contents distribution route management using content IDs, provider IDs and user IDs and the usability of contents at a terminal. Many practical usages may be possible with this contents distribution route management. For example, this management may be set such that any content that does not contain a content ID inserted therein cannot be used, the flow of the use of contents may be made the same as in the case where contents are legally distributed when a license check processing using each of the IDs results in a judgment that "the distribution route of content is outside the management."

In this manner, by inserting a content ID, provider ID and user ID as watermark information in contents, the contents can be distributed in a manner that the legal distribution route of the contents among the contents holder, the provider and the terminal is embedded in the contents. The legality of the distribution route of the contents can be confirmed by detecting the watermark information embedded in the contents. By comparing the actual distribution route of the contents and the legal distribution route of the contents embedded in the contents, the correctness of the distribution routes of the contents confirmed. For example, each terminal may be provided with a function that judges the level of correctness of distribution routes of contents when the contents are used at the terminal, and controls the use of the contents depending on the judgment result. For example, when music contents are reproduced, more noise may be inserted in the contents as the correctness of distribution routes of the contents lowers (e.g., the number of legal distribution routes lowers). In this manner, processings can be conducted according to the level of correctness of the distribution routes of contents.

In accordance with the embodiments of the present invention, information for judging the legality of distribution routes of contents can be substituted for licenses, and thus a high level contents protection can be achieved.

In accordance with the embodiments of the present invention, the use of contents can be controlled according to the legality of distribution routes of the contents, which is also effective for contents holders because the contents can be distributed through reliable distribution routes. Also, users of the contents can feel assured because they can use the contents of secure identity.

Several IDs may be combined for the use in the contents distribution route management of the present invention, or judgments as to the usability of contents at the terminal side may be changed, which is effective in conducting the contents distribution route management according to the security level of contents that are desired to be protected.

When a distribution route of contents is judged to be illegal, the function of notifying the certification authority or the contents guarantee authority can find the illegal distribution of the contents. Therefore, the present invention is effective because a network police becomes unnecessary. Even through illegalities may not be notified, contents that are obtained through illegal distribution routes cannot be used at terminals, such that the illegal distribution of the contents does not become widespread.

In view of the above, in accordance with the present invention, digital contents are managed by provider IDs, such that the distribution route of the digital contents can be guaranteed for either or both of holders of the contents and users of the contents. Also, in accordance with the present invention, providers that illegally distribute digital contents can be specified, and the use of illegally distributed digital contents can be controlled, such that the illegal distribution of the digital contents can be restricted.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An apparatus that uses digital contents, the apparatus comprising:
    a reception processing section that receives from a provider apparatus a certificate containing a first provider ID embedded therein by a certification authority, and a digital content having a second provider ID embedded therein by a contents guarantee authority;
    a first check processing section that judges by using the certificate as to whether or not the provider is authorized by the certification authority;
    a storage processing section that reads the first provider ID from the certificate, correlates the first provider ID with the digital content, and store the digital content in a recording medium;
    a detection processing section that detects the second provider ID from the digital content;
    a second check processing section that compares the first provider ID and the second provider ID to judge whether or not the first provider ID and the second provider ID match; and
    a use processing section that uses the digital content according to a decision made by the second check processing section.

2. An apparatus according to claim 1, wherein the use processing section restricts the use of the digital content when the second check processing section decides that the first provider ID and the second provider ID do not match.

3. An apparatus according to claim 1, wherein the second provider ID is embedded as electronic watermark in the digital content by the contents guarantee authority.

4. An apparatus according to claim 1, further comprising:
a notification processing section that notifies at least one of the certification authority, the contents guarantee authority and a contents holder owning the copyright of the digital content, when the second check processing section decides that the first provider ID and the second provider ID do not match.

5. An apparatus according to claim 4, wherein the notification processing section notifies at least one of the certification authority, the contents guarantee authority and the contents holder of at least one of the first provider ID and the second provider ID, when the second check processing section decides that the first provider ID and the second provider ID do not match.

6. An apparatus according to claim 1, wherein the detection processing section decides that a distribution route of the digital content is outside of a range of management when the second provider ID is not detected from the digital content, and the second check processing section decides that the distribution route of the digital content is illegal when the second check processing section decides that the first provider ID and the second provider ID do not match.

7. An apparatus according to claim 1, wherein the recording medium includes a contents storage section that stores the digital content, and a license management section that has a higher tamper resistance than the contents storage section and stores the first provider ID correlated with a name of the digital content.

8. An apparatus according to claim 1, wherein the detection processing section detects a content ID from the digital content when the detection processing section does not detect the second provider ID from the digital content, and the use processing section permits the use of the digital content when the detection processing section does not detect the content ID from the digital content.

9. An apparatus according to claim 1, wherein
the provider apparatus embeds in the digital content a first user ID of a unit that uses the digital content,
the recording medium stores a second user ID,
the detection processing section detects the first user ID from the digital content when the second check processing section decides that the first provider ID and the second provider ID match, and
the second check processing section compares the first user ID and the second user ID to decide whether or not the first user ID and the second user ID match.

10. An apparatus according to claim 1, wherein the reception processing section requests the provider apparatus for the certificate before requesting the provider apparatus for the digital content, receives the certificate from the provider apparatus, requests the provider apparatus for the digital content when the first check processing section decides by using the certificate that the provider is authorized by the certification authority, and receives the digital content from the provider apparatus.

11. An apparatus according to claim 1, wherein the storage medium stores a list of invalid certificates created by the certification authority, and the first check processing section decides that the provider is authorized by the certification authority when a certificate ID of the certificate is not included in the list of invalid certificates.

12. A method for using digital contents, the method comprising the steps of:
requesting a provider apparatus for a certificate containing a first provider ID embedded therein by a certification authority, and receiving the certificate from the provider apparatus;
deciding by using the certificate as to whether or not the provider is authorized by the certification authority;
requesting the provider apparatus for a digital content having a second provider ID embedded therein by a contents guarantee authority when the provider is authorized by the certification authority, and receiving the digital content from the provider apparatus;
reading the first provider ID from the certificate;
correlating the digital content with the second provider ID and storing the digital content in a storage medium;
detecting the second provider ID from the digital content in response to a request to use the digital content;
comparing the first provider ID and the second provider ID when the second provider ID is detected;
using the digital content when the first provider ID and the second provider ID match; and restricting the use of the digital content when the first provider ID and the second provider ID do no match.

13. An apparatus that provides digital contents to a terminal, the apparatus comprising:
a storage device that stores a certificate having a first provider ID embedded therein by a certification authority and a digital content having a second provider ID embedded therein by a contents guarantee authority;
a first transmission processihg section that transmits the certificate to the terminal in response to a request from the terminal; and
a second transmission processing section that transmits the digital content to the terminal in response to a request from the terminal, when the terminal decides by using the certificate that the provider is authorized by the certification authority,
wherein the terminal compares the first provider ID and the second provider ID to decide whether or not the first provider ID and the second provider ID match, and uses the digital content according to a resultant decision as to whether or not the first provider ID and the second provider ID match.

14. An apparatus according to claim 13, wherein the storage device stores a first terminal ID of a terminal that is authorized to receive the digital content, and the provider apparatus is equipped with a terminal certification section that requests the terminal for a second terminal ID before the second transmission processing section transmits the digital content to the terminal, and compares the first terminal ID and the second terminal ID to decides as to whether or not the first terminal ID and the second terminal ID match.

15. An apparatus according to claim 14, wherein the second transmission processing section transmits the digital content to the terminal when the terminal certification section decides that the first terminal ID and the second terminal ID match.

16. A method for providing digital contents to a terminal, the method comprising the steps of:
storing a certificate having a first provider ID embedded therein by a certification authority and a digital content having a second provider ID embedded therein by a contents guarantee authority;
transmitting the certificate to the terminal in response to a request from the terminal; and transmitting the digital content to the terminal in response to a request from the terminal, when the terminal decides by using the certificate that the provider is authorized by the certification authority, wherein the terminal compares the first provider ID and the second provider ID to decide whether or not the first provider ID and the second provider ID match, and uses the digital content according to a resultant decision as to whether or not the first provider ID and the second provider ID match.

17. An apparatus that uses digital contents, the apparatus comprising:

a storage device that stores a first user ID of a unit that uses a digital content;

a reception processing section that receives from a provider apparatus a digital content having a second user ID of the unit embedded therein;

a detection processing section that detects the first user ID from the digital content;

a check processing section that compares the first user ID and the second user ID to decide as to whether or not the first user ID and the second user ID match; and a use processing section that uses the digital content according to a decision of the check processing section.

18. A method for using digital contents, the method comprising the steps of:

storing a first user ID of a unit that uses a digital content;

receiving a digital content having a second user ID of the unit embedded therein from a provider apparatus that provides the digital content;

detecting the first user ID from the digital content;

comparing the first user ID and the second user ID and deciding as to whether or not the first user ID and the second user ID match; and using the digital content according to a decision made in the step of deciding.

19. An apparatus that uses digital contents, the apparatus comprising:

a reception processing section that receives from a provider apparatus a certificate having a first provider ID embedded therein by a certification authority and receives from another provider a digital content having a second provider ID embedded therein by a contents guarantee authority;

a first check processing section that decides by using the certificate as to whether or not the provider is authorized by the certification authority;

a storage processing section that reads the first provider ID from the certificate, correlates digital content with the first provider ID and stores the digital content in a storage medium;

a detection processing section that detects the second provider ID from the digital content;

a second check processing section that compares the first provider ID and the second provider ID and decides as to whether or not the first provider ID and the second provider ID match; and a use processing section that uses the digital content according to a decision made by the second check processing section.

20. A method for using digital contents, the method comprising the steps of:

requesting a provider apparatus for a certificate containing a first provider ID embedded therein by a certification authority, and receiving the certificate from the provider apparatus;

deciding by using the certificate as to whether or not the provider is authorized by the certification authority;

requesting another provider apparatus for a digital content having a second provider ID embedded therein by a contents guarantee authority when the provider is authorized by the certification authority, and receiving the digital content from the other provider apparatus;

reading the first provider ID from the certificate;

correlating the digital content with the first provider ID and storing the digital content in a storage medium;

detecting the second provider ID from the digital content in response to a request to use the digital content;

comparing the first provider ID and the second provider ID when the second provider ID is detected;

using the digital content when the first provider ID and the second provider ID match; and restricting the use of the digital content when the first provider ID and the second provider ID do no match.

* * * * *